UNITED STATES PATENT OFFICE.

ALBERT P. MEYER, OF PITTSBURGH, PENNSYLVANIA, ASSIGNOR TO ALLEN S. DAVISON COMPANY, OF PITTSBURGH, PENNSYLVANIA, A CORPORATION OF PENNSYLVANIA.

PROCESS OF MAKING FURNACE-LINING MATERIALS.

1,300,631. Specification of Letters Patent. Patented Apr. 15, 1919.

No Drawing. Continuation of application Serial No. 50,632, filed September 14, 1915. This application filed March 29, 1917. Serial No. 158,333.

*To all whom it may concern:*

Be it known that I, ALBERT P. MEYER, a citizen of the United States, residing at Pittsburgh, in the county of Allegheny and State of Pennsylvania, have invented certain new and useful Improvements in Processes of Making Furnace-Lining Materials, of which the following is a specification.

This invention relates to processes of making furnace lining materials; and it comprises a method wherein granules of highly refractory material together with a proportion of less refractory material are passed through an internally fired rotary kiln at such a temperature and under such conditions that the less refractory material is taken up by the granules of the more refractory material without substantial sintering together or clinkering of the granules, the highly refractory material being such a material as magnesia, lime, or magnesian lime (dolomitic lime) and the less refractory material being advantageously of a slag-like nature (basic open hearth slag); all as more fully hereinafter set forth and as claimed.

In the lining of furnace chambers, and particularly the type of furnace chambers known as basic open hearths, a number of contradictory requirements must be met. The lining must be infusible at the furnace temperature, it must contain nothing that will reduce under furnace conditions to give materials contaminating the metal melted or treated, it must be impervious and must not crack or disintegrate with changes in temperature. Since the material must be refractory and not suffer changes with temperature and at the same time must under furnace conditions unite to form an impervious layer, it is obvious that the requirements are contradictory. The best materials which have been found for this purpose are certain grades of magnesia and the more magnesian limes, such as dolomitic lime. Lime although refractory enough and not reducible under furnace conditions, is not ordinarily employed for the reason that its slaking properties make it inconvenient to handle and use. The high-magnesia limes made from dolomite and the like have the slaking characteristics in less degree; but it is not entirely absent even when they are dead burnt. It is obviously highly undesirable that a material to be used for a furnace lining should contain either water or carbon dioxid; it is undesirable that it should air-slake on exposure to air. Magnesia being highly refractory and not being hygroscopic or absorbing carbon dioxid to any great degree has heretofore proved one of the best of these basic lining materials. Its very refractory qualities however prevent absolutely pure magnesia making a desirable furnace lining since it does not bond well under heat; it tends to dust out and does not give a good impervious permanent lining. For this reason in the art the use of absolutely pure magnesia is not common; special grades containing some silica and iron which will serve as a bonding agent proving more satisfactory. With a magnesia containing a little iron oxid and silica or silicates as an impurity the material loses its refractory qualities in some degree and when exposed to high heat it sinters interiorly as well as exteriorly to some degree. The dolomitic limes when absolutely free from silica and iron are rather unsatisfactory for the same reason.

In patching or repairing furnace linings the same problems arise.

I have found that I can make any of these basic refractory substances satisfactory and produce a material practically permanent in handling and storage while at the same time making it bond in a better way in lining a furnace or patching an existing lining. In the present invention I pass these basic refractory materials in granular form downward through an inclined rotary kiln of the type of those used in burning cement but somewhat hotter, together with a small proportion of a less refractory protective material. Ordinarily I use basic slag. The granules of the basic refractory material, say dolomite, in their progress through the kiln are calcined and burnt at a high temperature; that is, they are dead-burnt. At the same time the granules or grains of the less refractory material, such as basic slag, accompanying these granules of dolomite, are taken up by the dolomitic lime, the heat being high enough to permit this. I use no more of the basic slag than will be taken up by the granules of dolomite in their passage through the kiln. I do not desire to agglomerate the dolomite granules and produce a slaggy or clinkery product at the lower end of the kiln. In any event the use of any more basic slag than would be taken up by the granules is undesirable as lessening the refractory quality of the final product. I aim to use merely enough of the basic slag to give a substantial protection to the dolomite granules in shipping and storage. In the final use of the material produced in the open hearth furnace this small amount of basic slag acts as a bonding agent so that the production of a lining *in situ* is ready and positive.

To this end, in a specific embodiment of my invention I crush a dolomite rock to about ₁₆ths inch granules or other appropriate size and screen out the dust. The granular material I next transmit through a rotary internally fired drying chamber to rid it of moisture. The dried granules I next burn in a rotary kiln. The sealing and bonding agent is added at the time of burning. Presuming that it is added at this time, and that basic slag is used, I charge in with the granules of lime a certain proportion (about 9 to 12 per cent.) of fine ground basic slag; say material which will pass a 50-mesh sieve. A kiln 120 feet long and 6 feet in internal diameter has proved satisfactory. The kiln may be fired in any way so as to produce a very hot clinkering zone. A temperature of 2800° F., or as much more as the kiln will stand, may be used. With natural gas firing a forced blast of air may be used; introducing, say, ten times as much air as gas. The material in passing through the furnace is freed of carbon dioxid, or burnt and is also condensed or sintered (dead burnt). And the tumbling or moving granules as they pass downward pick up the more fusible basic slag, and this addition of slag is perfected and made uniform in the progress down through the kiln. On emerging from the kiln, the material, which is now coated or filmed and protected, or perhaps impregnated to some extent, is cooled in any of the usual ways, and is ready for use. It may be bagged and stored for any length of time without fear of deterioration since, because of the sealing layer, the interior of the granule does not absorb moisture or carbon dioxid to any substantial extent.

Material made as described although it will bond readily in a furnace, nevertheless as a whole has a melting temperature above 3200° F.

Material made with basic open hearth slag as a coating or sealing and bonding agent is particularly well adapted for use in lining and patching basic open hearth furnaces since it does not introduce anything foreign thereto. Similarly other slags coming from particular types of furnaces may be used as a bonding and sealing agent in making lining material for such furnaces. Various silicate minerals, rocks or slags may also be employed. But I find it best, and particularly for open hearth furnaces, to use basic open hearth slag as the bonding agent. This slag being a product of the basic open hearth furnaces its presence in proper proportion in the lining is naturally unobjectionable. The proportion of sealing and protecting material used in and with the granule will of course depend upon the size of granule to a large extent. As long as there is sufficient material to coat the granule the amount is, within limits, not very material since in use any excess is absorbed by the granule in producing the furnace lining.

In use, the coated granules made as described are applied to the furnace bottom or hearth in the usual way, some tar being used as a temporary binder if desired. On heating up the furnace, the film of more fusible material existing on the exterior of the granules softens and adjacent films unite. On tamping into place a dense, hard, compact and resistant lining is produced which may be smoothed down to an almost glassy finish. The amount of bonding agent between the granules is automatically adjusted in making the lining, any excess there may be over the amount necessary to form the desired thin linking and bonding films being simply absorbed by the granules. The lining thus produced is of course of a different type from that made by the usual somewhat impure magnesias and dolomitic limes since the bonding agent, for the most part, exists on the surface of the granules while in the basic materials heretofore considered best adapted for furnace linings the bonding material was distributed through the body of the granule. It is obvious that with a fusible material existing within the granule in sufficient amounts to cause the surface of the granules to unite satisfactorily, the material is less refractory than the material of the present invention where the bonding agent is mainly exteriorly located.

Instead of burning the basic material and coating at substantially the same time, these operations may be performed separately; the granules being first burnt as described but without the presence of a bonding agent and thereafter sent through another kiln together with the bonding agent. Where this double operation is performed not much time should lapse between the operations; it being better to afford no opportunity for reabsorption of carbon dioxid and moisture by the granules to be coated or filmed. Ordinary limestones yielding fat lime may be treated in exactly the same manner to give a satisfactory product. Magnesite may also be treated in the same manner though the temperatures required are not as high.

In lieu of basic slag an iron ore carrying substantial proportions of silica may be used. An ore carrying say around 40 per cent. silica and 40 per cent. iron is quite suitable. Such an iron ore, like basic slag, gives a bonding agent which does not affect the charge in the operation of a basic open hearth furnace. Instead of using a silicious iron ore, a mixture of iron ore with enough sand or silica to bring the total amount of silica to 20 per cent. or more may be used; being first sintered or clinkered and then reground if desired. For other purposes than the lining of basic open hearth furnaces other slags than basic open hearth slag may be used. The particular nature of the sealing and bonding agent used will depend upon the purpose to which the material is subsequently to be applied. But ground basic slag is a very good sealing and bonding agent for most purposes.

Instead of marketing the material as loose granules, it may be taken as it comes from the furnace while it is still hot and be pressed into bricks or other shapes appropriate for lining purposes. Or it may be reheated and shaped. The compactness of the brick or other shape will depend of course on the heat and pressure; and the article may indeed be so compacted that when placed in the furnace the granules need no further bonding among themselves and the action of the heat of the furnace merely unites the faces of the brick. In one embodiment of my invention indeed, I press the hot material into bricks of suitable shape for lining purposes and place these bricks in position with a layer of loose granular material, which may be that made under the present invention, between as a cementing agent.

I do not claim herein as my invention the artificially prepared granular material consisting of the dolomite coated with the basic slag, nor the broad process of producing the same which consists in agitating the granules of dolomitic lime with the basic slag, such matter having been claimed in my prior application Serial No. 50632 of which this is a continuation and such matter having been the subject of an interference involving the application of one J. C. Barr to whom priority of invention was awarded.

What I claim is:—

1. The process of making granular refractory material which comprises passing a mixture of granules of highly refractory material and a proportion of less refractory material together through substantially the entire length of an internally fired rotating kiln under such conditions that the less refractory material is taken up by the granules of the more refractory material without substantial sintering together or clinkering of the granules.

2. The process in accordance with claim 1 in which the highly refractory material is dolomitic lime.

3. The process in accordance with claim 1 in which the less refractory material is basic open hearth slag.

4. A process in accordance with claim 2 in which the less refractory material is basic open hearth slag.

5. The process according to claim 1, in which the proportion of the highly refractory material is about 91 to 88 per cent. and the proportion of less refractory material is about 9 to 12 per cent.

6. The process in accordance with claim 1 in which the granules of the higher refractory material preliminarily used are about $\frac{3}{16}$th inch.

7. A process in accordance with claim 1 in which the less refractory material is preliminarily ground to size which will pass about a 50-mesh sieve.

8. The process of making granular refractory material which comprises passing granules of highly refractory material through an internally fired rotary kiln under such conditions as to burn them and thereafter passing such product together with a less refractory material through substantially the entire length of an internally fired rotary kiln under such conditions that the less refractory material is taken up by the granules of the more refractory material without substantial sintering together or clinkering of the granules.

9. The process of making protected, granular, refractory material which comprises feeding granulated dolomite down through an inclined rotary kiln substantially from end to end against flame and flame gases together with granules of a less refractory protective material, the amount of the second type of granule being not greater than will be taken up by the first mentioned granules without destroying the individuality of said first mentioned granules and the length of travel and temperature conditions being such that the dolomite granules are calcined and dead burnt and the less refractory material is wholly taken up by such granules in their progress through the kiln with delivery at the lower end of a calcined dead burnt protected granulated material.

In testimony whereof I affix my signature.

ALBERT P. MEYER.